US012769671B2

(12) United States Patent
Thyamagondlu et al.

(10) Patent No.: US 12,769,671 B2
(45) Date of Patent: Oct. 20, 2026

(54) ADDRESS TRANSLATION CACHE (ATC) FOR VIRTUALIZED TRANSACTION BASED DEVICES

(71) Applicant: XILINX, INC., San Jose, CA (US)

(72) Inventors: Chandrasekhar Srinivasaiah Thyamagondlu, Saratoga, CA (US); Sebastian Turullols, Los Altos, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 19/176,052

(22) Filed: Apr. 10, 2025

(65) Prior Publication Data

US 2026/0319964 A1 Oct. 15, 2026

(51) Int. Cl.
*G06F 12/10* (2016.01)
*G06F 12/1027* (2016.01)
*G06F 12/1081* (2016.01)

(52) U.S. Cl.
CPC ...... *G06F 12/1027* (2013.01); *G06F 12/1081* (2013.01)

(58) Field of Classification Search
CPC .. G06F 12/10; G06F 12/1027; G06F 12/1081; G06F 12/02; G06F 13/10; G06F 13/28; G06F 13/06; G06F 9/455; H06L 67/1097
See application file for complete search history.

(56) References Cited

U.S. PATENT DOCUMENTS

| | | | | |
|---|---|---|---|---|
| 2020/0050558 | A1* | 2/2020 | Suri | G06F 13/4282 |
| 2023/0333990 | A1* | 10/2023 | Helmick | G06F 12/1045 |
| 2024/0143508 | A1* | 5/2024 | Benisty | G06F 12/1027 |
| 2024/0168891 | A1* | 5/2024 | Sharma | G06F 12/1027 |
| 2024/0411701 | A1* | 12/2024 | Chin | G06F 12/0246 |

* cited by examiner

*Primary Examiner* — Tracy C Chan
(74) *Attorney, Agent, or Firm* — Patterson + Sheridan, LLP

(57) ABSTRACT

An interposer includes a controller and an address translation cache (ATC) system communicatively coupled to the controller. The ATC system is configured to receive a translation request from the controller, the translation request comprising a command identifier (ID) associated with a command and a guest physical address (GPA) bundle having at least one GPA, the at least one GPA being associated with at least one physical region page (PRP) located in a host memory of a host device. The ATC system is further configured to store address translation information in a multi-table cache memory, the address translation information comprising at least one system physical address (SPA) of the host memory translated from the at least one GPA, where the address translation information is indexed in the multi-table cache memory based on the command ID.

20 Claims, 8 Drawing Sheets

ADDRESS TRANSLATION CACHE (ATC) FOR VIRTUALIZED TRANSACTION BASED DEVICES

TECHNICAL FIELD

Examples of the present disclosure generally relate to integrated circuit (IC) design, and in particular to an address translation cache (ATC) architecture for virtualized transaction based devices.

BACKGROUND

Non-volatile Memory Express (NVMe) is a widely used high-speed interface protocol that allows host software to communicate with input/output (I/O) devices such as flash-based storage devices (e.g., solid-state drives (SSDs)). Specialized accelerators use the NVME interface for non-storage applications due to its high bandwidth and low CPU core driver overhead. For applications demanding high data transfer rates, an address translation cache (ATC), also known as a Translation Lookaside Buffer (TLB), can be employed to reduce the overhead of address translations. Traditional ATCs store virtual-to-physical address translation entries in a content accessible memory (CAM) that requires a large on-die area. Also, the traditional ATCs lack the ability to lock the translations for cut-through accelerations for NVMe devices.

Thus, an ATC architecture that supports virtual NVMe devices for high-bandwidth and low-latency data communication is desired.

SUMMARY

Systems, methods, and apparatuses are described for caching address translations in an ATC architecture to enable high-bandwidth and low-latency data communication.

According to one aspect, an interposer connectable between a host device and a storage device comprises a controller and an address translation cache (ATC) system communicatively coupled to the controller, wherein the ATC system is configured to: receive a translation request from the controller, the translation request comprising a command identifier (ID) associated with a command and at least one guest physical address (GPA), the at least one GPA being associated with at least one physical region page (PRP) located in a host memory of the host device; store address translation information in a multi-table cache memory, the address translation information comprising at least one system physical address (SPA) of the host memory translated from the at least one GPA, wherein the address translation information is indexed based on the command ID; and transmit a translation response to the controller after the address translation information is stored in the multi-table cache memory.

According to another aspect, an address translation cache (ATC) system comprises circuitry configured to: receive a translation request, the translation request comprising a command identifier (ID) associated with a command and at least one guest physical address (GPA), the at least one GPA being associated with at least one physical region page (PRP) located in a host memory; and store address translation information in a multi-table cache memory, the address translation information comprising at least one system physical address (SPA) of the host memory translated from the at least one GPA, wherein the address translation information is indexed based on the command ID.

According to yet another aspect, a method by an address translation cache (ATC) system comprises: receiving a translation request, the translation request comprising a command identifier (ID) associated with a command and a guest physical address (GPA) bundle having at least one GPA, the at least one GPA associated with at least one physical region page (PRP) located in a host memory; storing address translation information in a multi-table cache memory, the address translation information comprising at least one system physical address (SPA) of the host memory translated from the at least one GPA, wherein the address translation information is indexed based on the command ID; and transmitting a translation response after the address translation information is stored in the multi-table cache memory.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
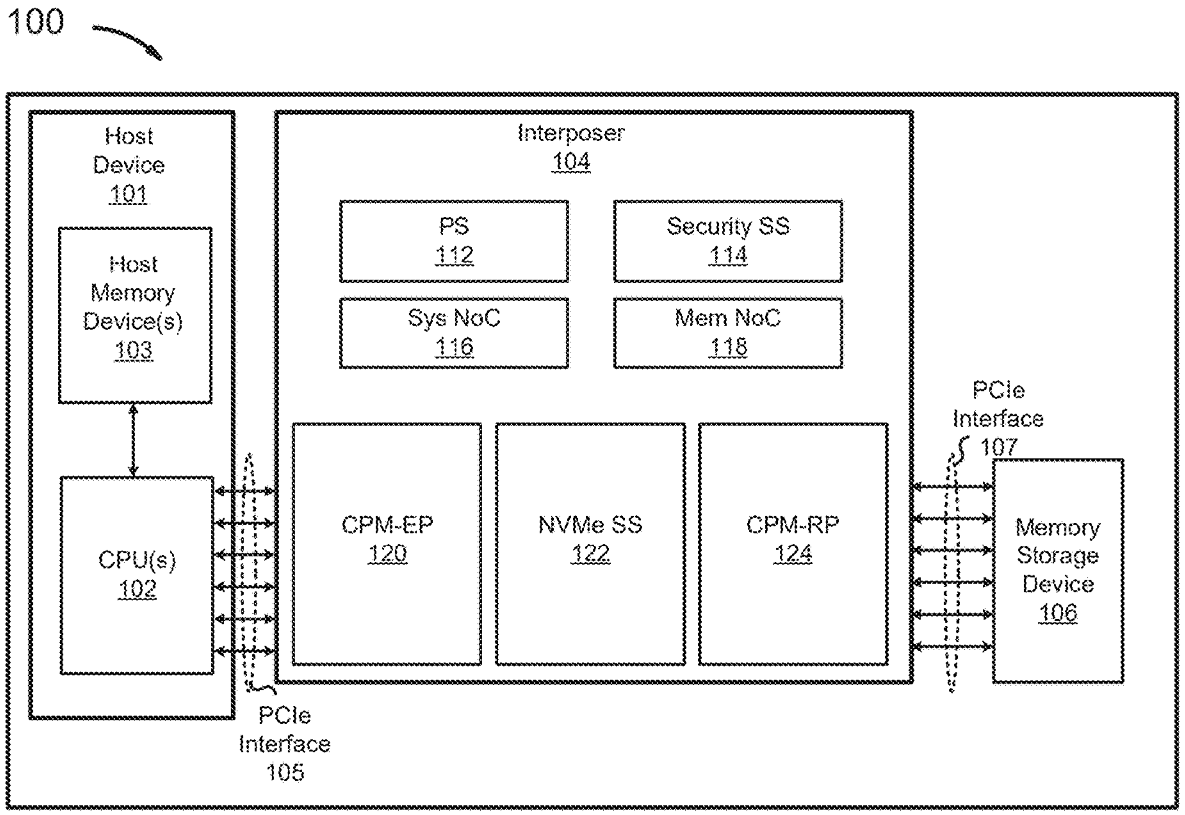
FIG. 1 illustrates a schematic diagram of a system-on-chip (SOC) environment, in accordance with an example embodiment of the present disclosure.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive explanation of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

According to embodiments of the present disclosure, an ATC architecture is provided to cache address translations for outstanding commands between a host device and a memory storage device. The commands are each assigned a command identifier (ID). Each command includes one or more virtual addresses (e.g., guest physical addresses (GPAs)), which correspond to physical region pages (PRPs) in the host memory. The virtual addresses are translated to system physical addresses (SPAs) of the host memory. The address translation information is cached in a multi-table cache memory and indexed based on the command ID. Caching the address translation information ensures that the memory pages are present in the host memory to avoid page faults. The virtual addresses in the command are converted to drive physical addresses (DPAs) that are embedded with the command ID before the command is transmitted to the memory storage device. The command ID is used to identify the SPAs during memory access operations, such as direct memory access (DMA) read or write operations.

According to embodiments of the present disclosure, the multi-table cache memory includes an ATC table, an ATC Indirect Table (AIT), and a command (CMD) map table. The multi-table structure reduces the overall size of the on-die memory (e.g., a static random access memory (SRAM)). In the multi-table cache memory, the ATC table stores address translation entries for each command, regardless of the command size. The address translation entries can be scattered (or fragmented) in the ATC table. The AIT stores the indexes of the ATC table entries based on the number of virtual addresses (e.g., the bundle size) in each command. The AIT entries for each command are stored in contiguous locations in a selected range in the AIT. The particular range in which the AIT entries are stored is selected based on the bundle size. The CMD map table stores an entry for each command indexed based on the command ID, where each entry in the CMD map table indicates the starting location (or index) of the AIT entries. The multi-table structure allows commands having different sizes (with different numbers of virtual addresses) to be efficiently stored in the ATC table, and enables a cut-through path with guaranteed cache-hit during a translation entry lookup. The multi-table cache memory also allows the table entries to be efficiently evicted (or released) after the commands are completed.

FIG. 1 illustrates a schematic diagram of a system-on-chip (SOC) environment 100, in accordance with an example embodiment of the present disclosure. As illustrated in FIG. 1, the SOC environment 100 includes a host device 101, an interposer 104, and a memory storage device 106 (e.g., having one or more SSDs).

The host device 101 includes one or more host processors (e.g., CPUs) 102 and one or more host memory devices 103. The CPUs 102 can include core processors for running operating systems and/or application processors for running applications. In a multi-host scenario, the CPUs 102 can each have an independent operating system communicating with a PCIe bus. In a bifurcation scenario, the PCIe lanes are split into two groups (e.g., two groups each having 8 PCIe lanes) and connect to two hosts. The CPUs 102 can execute programs (e.g., having NVMe device drivers) that communicate with the interposer 104. The CPUs 102 can send commands to the memory storage device 106 through the interposer 104 (e.g., through PCIe interfaces 105 and 107). These commands can specify the type of operation (e.g., read, write, and etc.), the address of the data to be accessed, and other relevant parameters. The CPUs 102 can allocate system resources, such as memory and I/O bandwidth, to ensure efficient data transfer between the CPUs 102 and the memory storage device 106. The host memory device(s) 103 can include volatile memories. In one example, the host memory device(s) 103 can include dynamic random access memories (DRAMs). The CPUs 102 can execute software loaded into the host memory device(s) 103 from the memory storage device 106 or other storage devices. In addition, the host device 101 supports single root I/O virtualization (SR-IOV), which allows a single physical PCIe device to be shared among multiple virtual machines (VMs) in a virtualized environment.

It is noted that the host device 101 can also include an input/output memory management unit (IOMMU) and a root complex (RC) not explicitly shown in FIG. 1. The CPUs 102, the host memory device(s) 103, the IOMMU, and the RC can be connected through an internal bus, not explicitly shown in FIG. 1.

In one embodiment, the interposer 104 can be an NVMe interposer that includes an NVMe processor subsystem (PS) 112, a security subsystem (SS) 114, a system network on chip (NoC) 116, and a memory NoC 118. The interposer 104 also includes a confidential PCIe and direct memory access module (CPM)-end point (EP) block 120, an NVMe subsystem (SS) 122, and a CPM-root port (RP) complex 124. It is noted that, in FIG. 1, the control and data paths in the interposer 104 are omitted for clarity. In other embodiments, the interposer 104 can be other types of interposers (e.g., a smart data accelerator interface (SDXI) interposer, etc.).

In some embodiments, the NVMe PS 112 can include an embedded processor complex for firmware (e.g., NVMe-1 firmware) execution. In some embodiments, the NVMe PS 112 can include an on-chip memory (OCM) for high bandwidth and low latency data communication. In some embodiments, the NVMe PS 112 can configure and operate one or more SSDs via the CPM-RP complex 124 and the system NoC 116. In some embodiments, the host device drivers (e.g., the NVMe device drivers from the CPUs 102) can configure the interposer 104 via the CPM-EP block 120, where the configuration is proxied to the NVMe PS 112.

In some embodiments, the security SS 114 can include a platform IP block that provides secure boot for the firmware and other housekeeping services for the interposer 104's application-specific integrated circuit (ASIC). In some embodiments, the security SS 114 can perform cryptographic functions such as encryption and decryption to protect data, and verification to avoid silent data corruption.

In some embodiments, the system NoC 116 can include a high-speed flexible network that interconnects the components in the interposer 104. The memory NoC 118 can help optimize memory access and data transfer within the interposer 104.

In some embodiments, the CPM-EP block 120 can include a subsystem instantiated in an endpoint configuration. The CPM-EP block 120 includes a PCIe host interface that provides PCIe endpoint functionalities for one or more hosts. As a primary host interface gateway, the CPM-EP block 120 can enable the interposer 104 to participate in virtualized NVMe acceleration solutions. The CPM-EP block 120 can be connected to the NVMe PS 112 via one or more advanced extensible interface memory mapped (AXI- MM) connections (e.g., 128 Gbps AXI-MM paths). The CPM-EP block 120 can be connected to the security SS 114 via one or more asynchronous serial interface connections (e.g., 512 Gbps ASI paths).

In some embodiments, the NVMe SS 122 can include an embedded processor complex for NVMe firmware execution. The NVMe SS 122 can provide core functionalities associated with NVMe SSD virtualization features.

In some embodiments, the CPM-RP complex 124 can include a subsystem instantiated in a root port configuration (e.g., a PCIe Gen5 root port configuration) to enable the interposer 104 to participate in virtualized NVMe acceleration solutions. In one example, the CPM-RP complex 124 includes six PCIe root port instances (or blocks) that provide PCIe root port functionalities for six SSDs in the memory storage device 106 via the PCIe interface 105. In one example, the CPM-RP complex 124 is the host coming up out of boot as a PCIe Gen5 root port configuration, connected to one or more NVMe physical SSDs (pSSDs).

In some embodiments, the interposer 104 is a self-contained integrated block. In some embodiments, the interposer 104 can rely on infrastructure around it for configuration, system-level management functionalities and interfaces, power, cooling, clocks, and reset sequencing.

Figure 2:
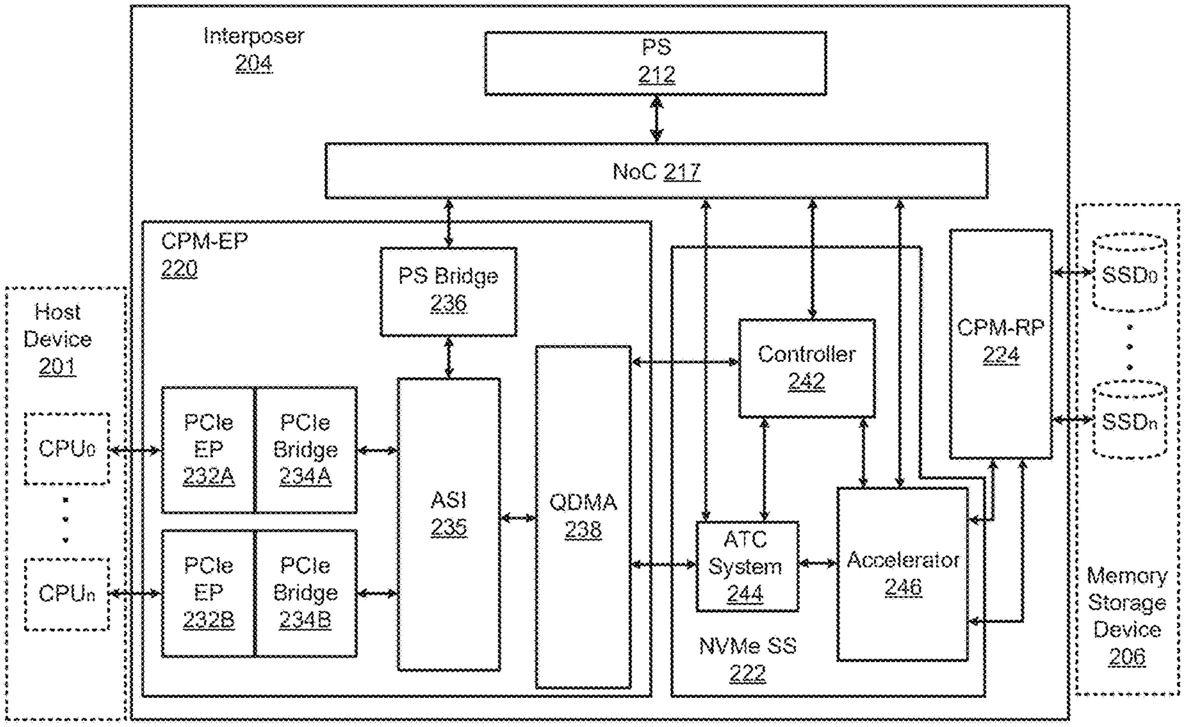
FIG. 2 illustrates a schematic diagram of an interposer between a host device and a memory storage device, in accordance with an example embodiment of the present disclosure.

FIG. 2 illustrates a schematic diagram of an interposer 204 between a host device 201 and a memory storage device 206, in accordance with an example embodiment of the present disclosure. The interposer 204 is a bridge between the host device 201 and the memory storage device 206 (e.g., having NVMe pSSDs). In one embodiment, the host device 201, the interposer 204, and the memory storage device 206 may substantially correspond to the host device 101, the interposer 104, and the memory storage device 106, respectively, as shown and described in FIG. 1.

As illustrated in FIG. 2, the interposer 204 includes a PS 212, a NoC 217, a CPM-EP block 220, an NVMe SS 222, and a CPM-PR complex 224. In one embodiment, the PS 212, the NoC 217, the CPM-EP block 220, the NVMe SS 222, and the CPM-PR complex 224 may substantially correspond to the NVMe PS 112, the NoC (e.g., the system NOC 116 and memory NOC 118), the CPM-EP block 120, the NVMe SS 122, and the CPM-PR complex 124, respectively, as shown and described in FIG. 1 above.

As illustrated in FIG. 2, the CPM-EP block 220 includes PCIe EPs 232A and 232B, PCIe bridges 234A and 234B, an adaptable streaming interconnect (ASI) 235, a PS bridge 236, and a quick data movement accelerator (QDMA) 238.

As illustrated in FIG. 2, the PCIe bridges 234A and 234B connect the respective PCIe EPs 232A and 232B to the ASI 235. The ASI 235 can direct traffic from multiple host interfaces to multiple subsystems (or blocks) within the interposer 204. For example, the ASI 235 can manage data flows associated with local PCIe-attached co-processors. The ASI 235 can provide PCIe-like connectivity between initiators and targets by means of transporting memory read requests, memory write requests, completions, and other types of transactions.

As illustrated in FIG. 2, the PS bridge 236 provides an interconnection between the ASI 235 and one or more CPUs in the PS 212. The PS bridge 236 can also connect to the NoC 217, for example, having a memory NoC (e.g., the memory NoC 118 in FIG. 1). The PS bridge 236 can contain an ASI-AXI bridge, other bus bridges, and/or other components. In some embodiments, a bridge to a bus may be provided. In some embodiments, an AXI bus (or other suitable bus) may be used, and an ASI-AXI bridge may be provided. In some embodiments, the PS bridge 236 follows AXI ordering semantics.

The QDMA 238 is a high-performance hardware accelerator for transferring data. In one embodiment, the QDMA 238 can include an adaptable queue manager and multi-channel DMA engine. The QDMA 238 can move data as one Gen5 x16 BW capable DMA engine or two virtual Gen5 x8 BW capable DMA engines in the bifurcated configuration of two Gen5 x8 PCIe interfaces. In some embodiments, the QDMA 238 can directly interface with the NVMe SS 222. As illustrated in FIG. 2, the QDMA 238 can communicate with the NVMe SS 222.

As illustrated in FIG. 2, the NVMe SS 222 includes a controller 242 (e.g., an NVMe controller), an ATC system 244, and an accelerator 246. The accelerator 246 can access the host device 201. The accelerator 246 can be connected to one or more SSDs in the memory storage device 206 through the CPM-RP complex 224.

In one embodiment, for DMA operations, the SSDs in the memory storage device 206 can be the DMA initiators for host memory access operations corresponding to disk reads and writes. The SSDs cannot handle page faults in the host device. As a result, prior to initiating a command or request, the interposer 204 ensures that the pages (e.g., the PRPs) are present in the host memory.

Figure 3:
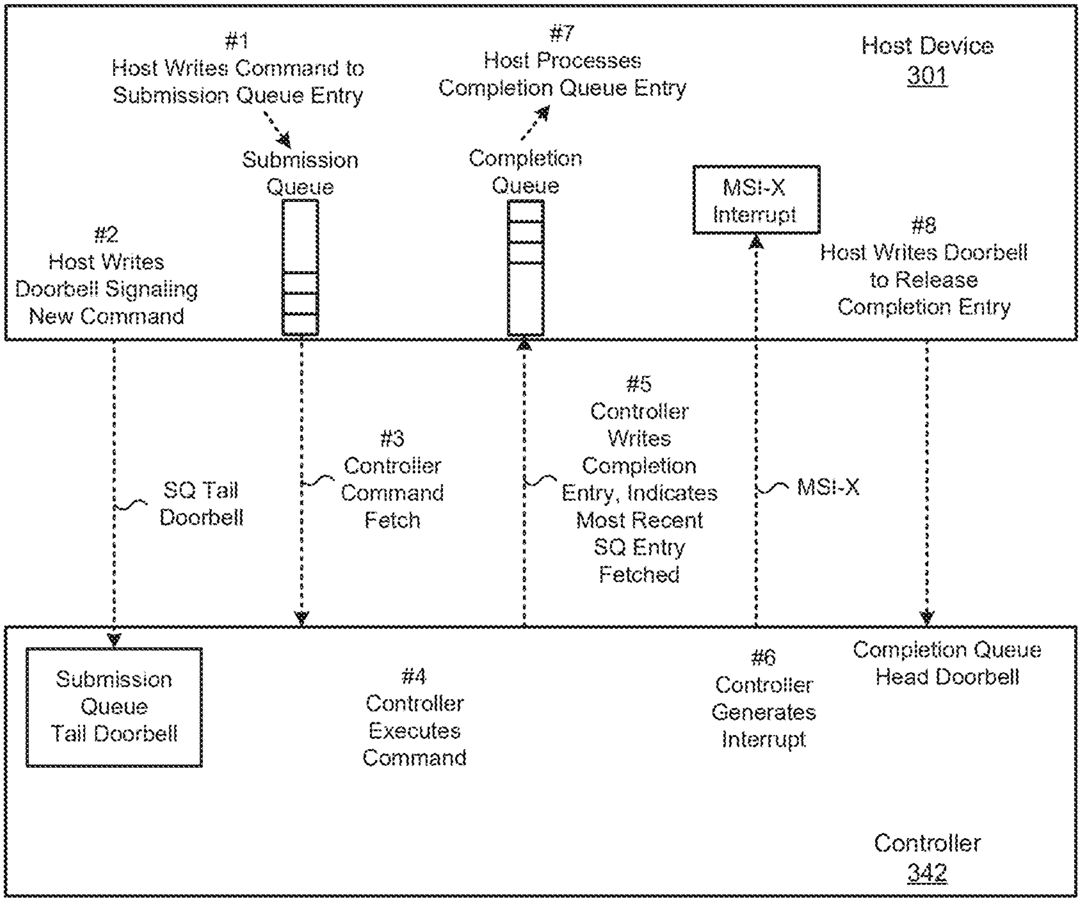
FIG. 3 illustrates a diagram of a procedure for command processing between a host device and a controller, in accordance with an example embodiment of the present disclosure.

FIG. 3 is a diagram illustrating a procedure for command processing between a host device 301 and a controller 342, in accordance with an example embodiment of the present disclosure. In the present embodiment, the host device 301 and the controller 342 may substantially correspond to the host device 201 and the controller 242 of the interposer 204, respectively, as shown and described in FIG. 2.

It should be understood that host software can communicate with the interposer using a command-response framework, for example, through an NVMe interface. The NVME interface can be attached using a variety of transports including PCIe based memory transport. The controller 342 can be bound to a PCIe physical function or virtual function. The controller 342 can include an admin queue pair (QP) and one or more I/O QPs. Each QP includes a submission queue (SQ) and a completion queue (CQ). In an NVMe over memory transport model, the queue pairs are allocated in the host memory.

As illustrated in FIG. 3, in step 1, the host device 301 writes a new command (e.g., an I/O command) to be transmitted to an SSD (not explicitly shown in FIG. 3), in a free SQ slot (e.g., a submission queue entry (SQE)) in the SQ. The new command can be stored in a free SQ slot in the SQ. The new command may be a write command, a read command, or another command. For example, the SQ can include a circular buffer with a fixed slot entry size that the host software uses to submit commands for execution by the controller 342.

In step 2, the host device 301 performs write access to a submission queue tail doorbell register of the controller 342 to notify the controller 342 that the new command has been stored in the SQ of the host device 301. For example, the host software updates the appropriate SQ Tail doorbell register when there are one to n new commands to execute. The previous SQ Tail value is overwritten in the controller 342 when there is a new doorbell register write.

In step 3, the controller 342 fetches the command from the SQ. The command can be temporarily stored in an SRAM of the controller 342. For example, the controller 342 fetches SQ entries (SQEs) in order from the SQ.

In step 4, the controller 342 executes the fetched command. It should be noted that the controller 342 can execute the commands in any order. For example, the controller 342 can process the commands in the order in which they are fetched. In some embodiments, the controller 342 can process the commands out of order (e.g., in an order different from the order in which the commands are fetched). The controller 342 can execute data transfer between the host memory (e.g., the host memory device(s) 103 in FIG. 1) and the memory storage device (e.g., the memory storage device 106 in FIG. 1).

In one embodiment, each SQE is a command. The commands may each be 64 bytes in size. The physical memory locations in the host memory to use for data transfers may be specified using PRP entries (or PRPs), where each PRP entry has a corresponding to a virtual address (e.g., a guest physical addresses (GPA)) in the host memory. Each command may include two PRP entries. If more than two PRP entries are necessary to describe the data buffer, then a pointer to a PRP List that describes a list of PRP entries can be provided.

In step 5, when a command process corresponding to the command is completed, the controller 342 writes a completion entry in the CQ of the host device 301. In the case where the commands are executed in order, the complication entry indicates the most recent SQ entry fetched. In one example, the CQ is a circular buffer with a fixed slot size used to post status for completed commands. A completed command can be uniquely identified by a combination of the associated SQ identifier and a command ID. The CQ head pointer is updated by the host software after processing completion queue entries (CQEs) indicating the last free CQ slot. A Phase Tag (P) bit is defined in the completion queue entry to indicate whether an entry has been newly posted without consulting a register.

In step 6, the controller 342 generates and transmits an interrupt message to the host device 301 to notify the host device 301 that a new completion response has been stored in the CQ or that there is a new CQE to consume and process. In FIG. 3, the interrupt message is an MSI-X interrupt message. In one embodiment, the generation and transmission of the interrupt message may be optional.

In step 7, the host device 301 obtains a completion response from a CQ slot in the CQ, and processes the completion entry.

In step 8, the host device 301 performs a write access to a completion queue head doorbell register in the controller 342 to release the completion entry.

Figure 4:
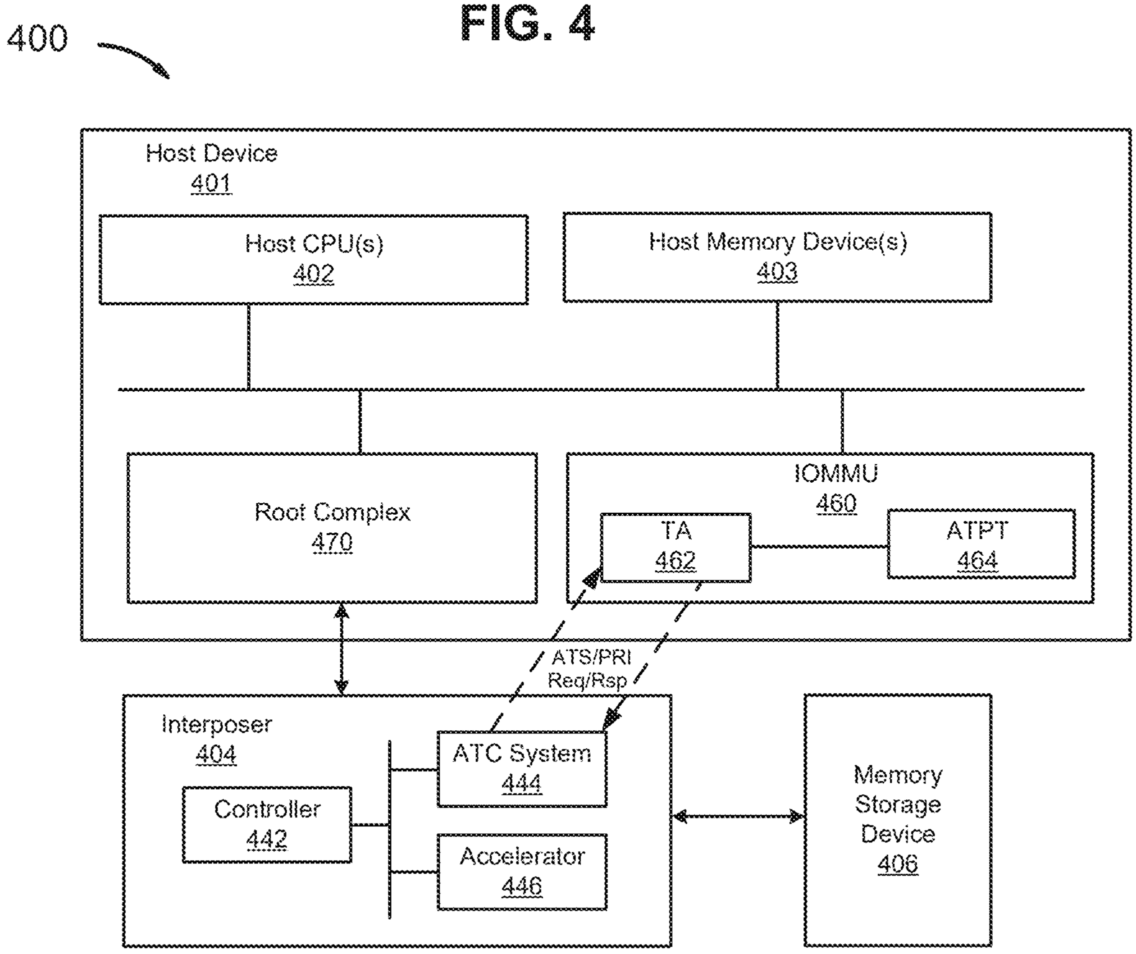
FIG. 4 illustrates a schematic diagram of an environment for address translation service (ATS)/page request interface (PRI) operations, in accordance with an example embodiment of the present disclosure.

FIG. 4 is a schematic diagram illustrating an environment 400 for ATS/PRI operations, in accordance with an example embodiment of the present disclosure. In the present embodiment, the example environment 400 includes a host device 401, an interposer 404, and a memory storage device 406. In one embodiment, the host device 401, the interposer 404, and the memory storage device 406 may substantially correspond to the host device 201, the interposer 204, and the memory storage device 206, respectively, as shown and described in FIG. 2.

As illustrated in FIG. 4, the host device 401 includes one or more host CPUs 402, one or more host memory devices 403, an IOMMU 460, and an RC 470.

The IOMMU 460 can provide ATS, for example, under the PCIe standard. As illustrated in FIG. 4, the IOMMU 460 includes a translation agent (TA) 462 and an address translation protection table (ATPT) 464. The functions of the TA 462 and the ATPT 464 can be implemented by a processor, dedicated hardware, or a combination thereof.

The TA 462 is responsible for processing memory translation requests from the interposer 404. The TA 462 can include an address translation cache referred to as a TLB. For example, before the memory storage device 406 can access the host memory device(s) 403 (e.g., through DMA reads or writes), the interposer 404 should ensure that the translated addresses are cached in an ATC system 444. In the present embodiment, the ATC system 444 is different from the TLB translation cache used by the host device 401 in the TA 462.

In one embodiment, the addresses in the commands provided to the interposer 404 from the host device 401 are virtual addresses that are untranslated address. Hence, address translation is done before the virtual addresses can be used to access the host memory device(s) 403. This is because the memory storage device 406 (e.g., having NVMe SSDs) may not be equipped to handle page faults in the host device 401, when it attempts to access the host memory device(s) 403. Thus, the interposer 404 performs ATS to ensure that the pages (e.g., the PRP(s)) are present in the host memory device(s) 403, as an interface agreement between the memory storage device 406 (e.g., an NVMe pSSD) and the host device 401.

When the interposer 404 receives a command from the host device 401, it fetches each of the PRPs and virtual addresses provided in the command. Thereafter, an ATS/PRI engine in the ATC system 444 transmits an ATS translation request to the TA 462 of the host device 401. ATS is a protocol for performing communication related to address translation between the host device 401 and the interposer 404. The ATS translation request is an address translation request to translate one or more virtual addresses (e.g., GPAs) to the corresponding physical addresses (system physical addresses (SPAs)) of the host memory device(s) 403. In some embodiments, there can be multiple copies of the same translation if two different outstanding commands reference the same virtual address.

After the TA 462 receives the ATS translation request, it searches the ATPT 464 and determines whether the address translation information corresponding to the virtual addresses specified by the ATS translation request is stored in the ATPT 464. If the address translation information is stored in the ATPT 464, the TA 462 obtains the address translation information from the ATPT 464, and transmits an ATS completion response having the address translation information to the ATS/PRI engine in the ATC system 444 (e.g., through the RC 470). The address translation information from the ATPT 464 includes the physical addresses (SPAs) corresponding to the virtual addresses (GPAs) specified by the ATS translation request. The ATC system 444 then stores the address translation information having the physical addresses (the translated addresses) and the corresponding virtual addresses in a multi-table cache memory as discussed in detail in FIG. 5.

On the other hand, if the TA 462 determines that the physical addresses corresponding to the virtual addresses specified by the ATS translation request are not stored in the ATPT 464 (or other errors have occurred), the TA 462 transmits an ATS response to the ATS/PRI engine of the ATC system 444 indicating that the ATS translation has failed. When the ATS response indicates that the address translation has failed, the ATS/PRI engine transmits a PRI request to the host device 401 (e.g., through the RC 470). The PRI request is for requesting the memory page(s) in the host memory device(s) 403 and for preparing the address translation information. After receiving the PRI request, the RC 470 notifies the received PRI request to a CPU or a virtual machine (VM) in the host device 401. This allows the CPU or the VM of the host device 401 to start a process of preparing the address translation information in the ATPT 464. When the address translation information is prepared, the host device 401 transmits a response to the ATC system 444. The response is a response to the PRI request to inform the ATC system 444 that the address translation preparation is completed. Thereafter, the ATC system 444 can transmit the ATS translation request again to the TA 462 and obtain the address translation information.

After the address translation information associated with a command is cached in the ATC system 444, the command is transmitted to the memory storage device, for example, through an accelerator 446. Thereafter, the memory storage device 406 can issue a memory access request (e.g., a DMA read/write request) to the host memory device(s) 403 through the interposer 404. The interposer 404 can process the memory access request and forward the translated physical address(es) (e.g., SPA(s)) to the host memory device(s) 403.

In addition, when the address translation information in the ATPT 464 is changed by, for example, updating the correspondence between the GPA space and the SPA space, the TA 462 can transmit an invalidation request to a pending invalidation table (PIT) check/scoreboard in the ATC system 444. The invalidation request is a request for invalidating old address translation information stored in the ATC system 444. The invalidation request may specify a specific range of virtual addresses to invalidate. After receiving an invalidation request, the PIT check/scoreboard of the ATC system 444 invalidates the entries in the ATC system 444 where the address translation information corresponding to the virtual addresses belonging to the specified range is stored. It is noted that, according to embodiments of the present disclosure, the ATC invalidation operation is held until commands using the associated buffers are naturally completed. In other words, cached translation entries in the ATC system 444 cannot be evicted or invalidated until the command is completed.

Figure 5:
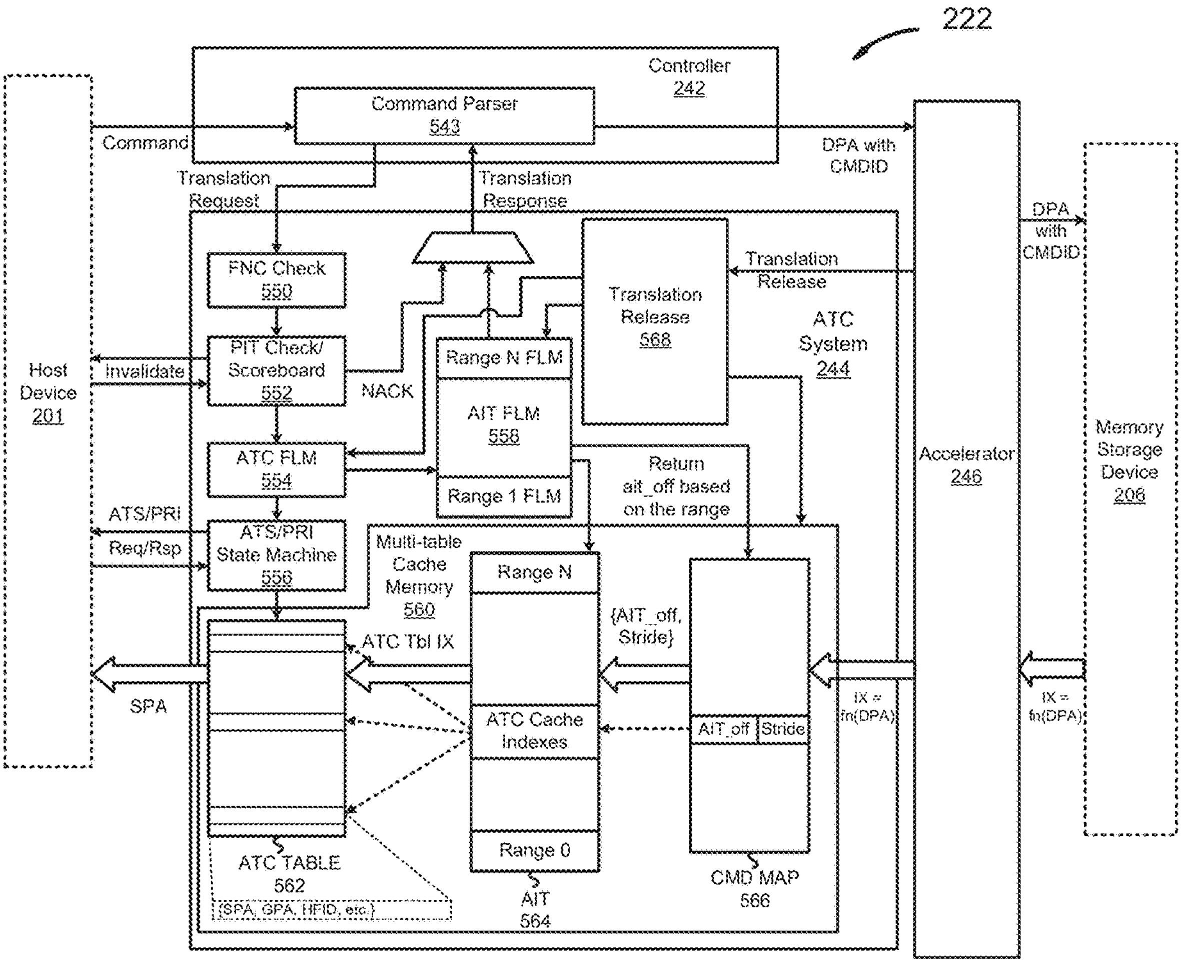
FIG. 5 illustrates a schematic diagram of an NVMe subsystem (SS), in accordance with an example embodiment of the present disclosure.

FIG. 5 is a schematic diagram illustrating the NVMe SS 222 in FIG. 2, in accordance with an example embodiment of the present disclosure. As illustrated in FIG. 5, the NVMe SS 222 as a part of an NVMe interposer (e.g., the interposer 204 in FIG. 2) is communicatively coupled to the host device 201 and the memory storage device 206.

As illustrated in FIG. 5, the controller 242 includes a command parser 543. The ATC system 244 includes a function check engine 550, a PIT check/scoreboard 552, an ATC free location manager (FLM) 554, an ATS/PRI state machine/scoreboard 556, an ATC Indirect Table (AIT) FLM 558, a multi-table cache memory 560, and a translation release engine 568. The functions of the controller 242 and the ATC system 244 are discussed with reference to FIGS. 6A, 6B, and 7 below.

Figure 6A:
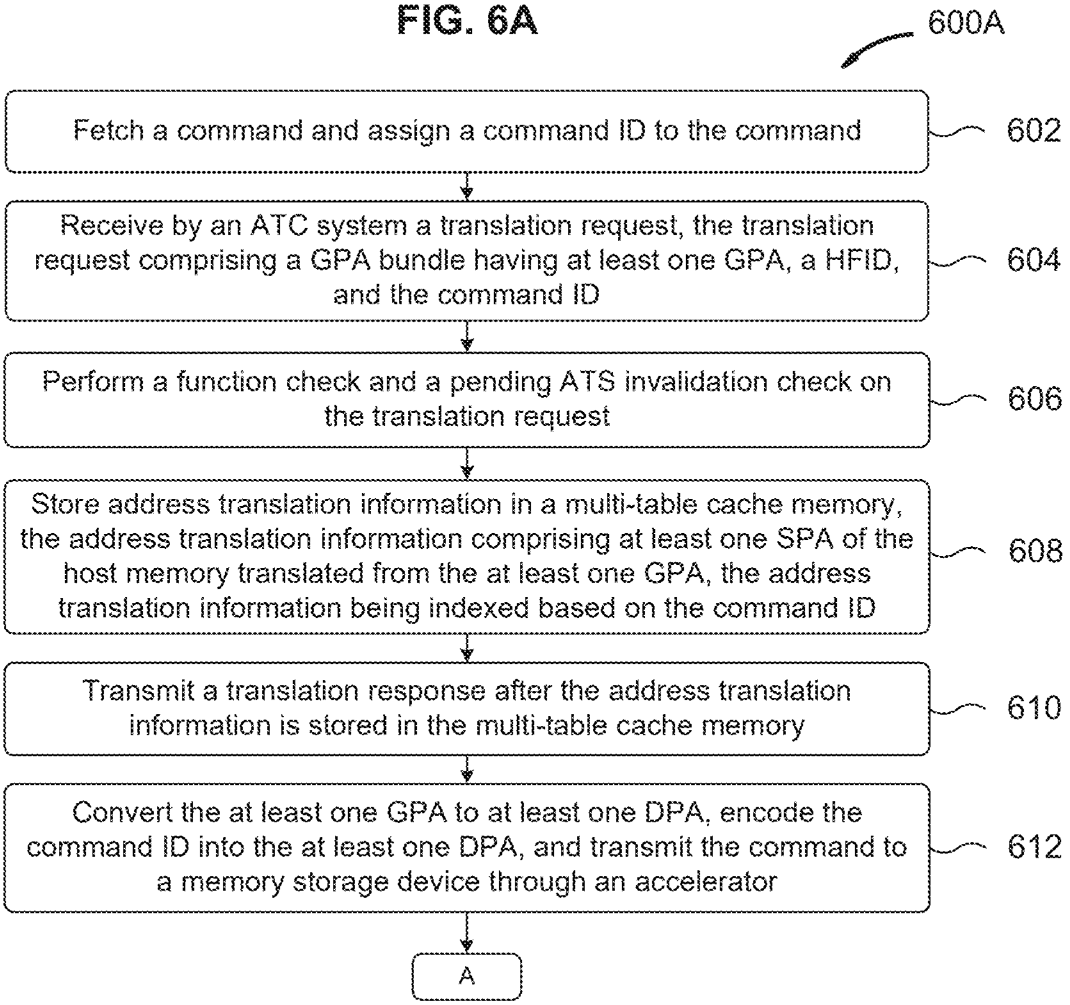
FIGS. 6A and 6B illustrate flowchart diagrams of a method for caching address translations for outstanding commands between a host device and a memory storage device, in accordance with an example embodiment of the present disclosure.
Figure 6B:
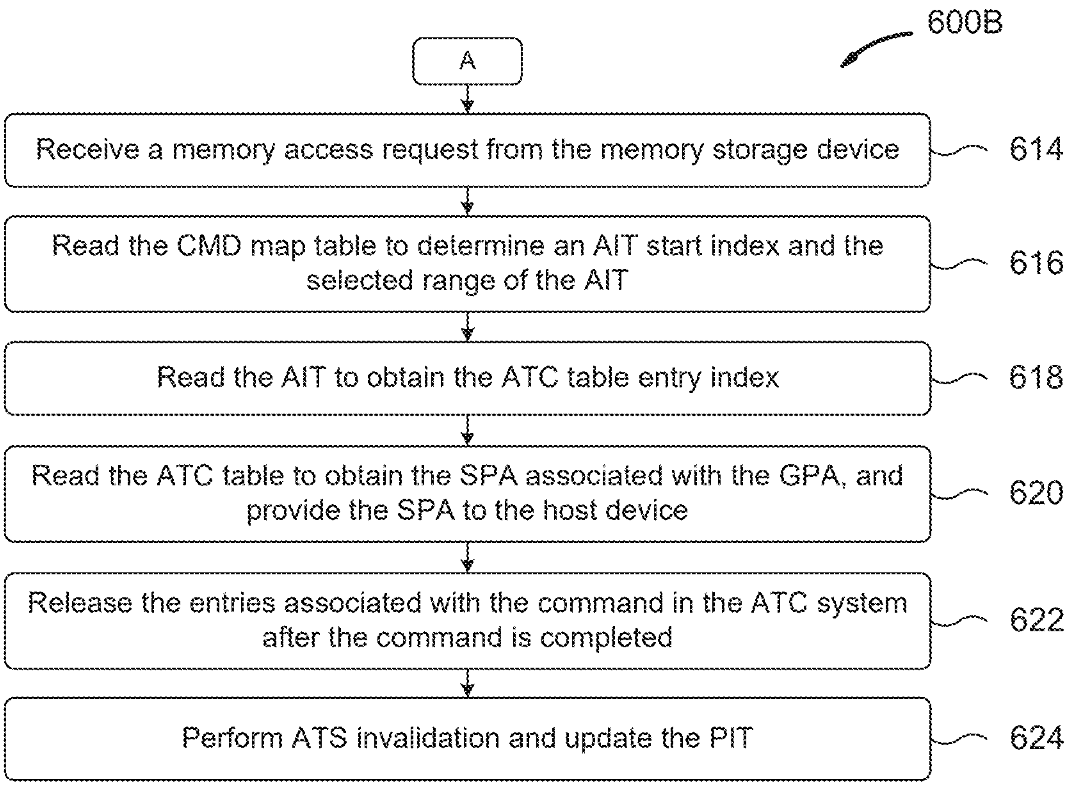

FIGS. 6A and 6B illustrate flowchart diagrams 600A and 600B, respectively, of a method for caching address translations for outstanding commands between a host device and a memory storage device, in accordance with an example embodiment of the present disclosure.

In block 602, a controller fetches a command and assigns a command ID to the command.

With reference to FIG. 5, the controller 242 fetches a command from the host device 201. For example, the host device 201 can perform write access to a submission queue tail doorbell register of the controller 242 to notify the controller 242 that a new command has been stored in the SQ of the host device 201. The controller 242 can then fetch the command from the SQ. In the present embodiment, for each command fetched, the controller 242 assigns a command ID from a list of available command IDs. It is noted that the command ID assigned to the command can be recycled after the command process is completed.

In block 604, a command parser of the controller transmits a translation request for the command to an ATC system. The ATC system receives the translation request from the command parser. The translation request includes a GPA bundle having at least one GPA, a host function identifier (HFID), and the command ID associated with the command.

With reference to FIG. 5, the command parser 543 of the controller 242 determines whether the command is one that is associated with accessing the host memory of the host device 201. In one example, the command from the host device 201 may be a read command (e.g., a DMA read) having one or more virtual addresses, where each virtual address identifies a location (e.g., a PRP) in the host memory where data read from the memory storage device 206 is to be stored. In another example, the command from the host device 201 may be a write command (e.g., a DMA write) having one or more virtual addresses, where each virtual address identifies a location (e.g., a PRP) in the host memory to retrieve data for writing into the memory storage device 206. A virtual address in the command can be a GPA that corresponds to a PRP located in the host memory.

When the command is identified as one that is associated with accessing the host memory of the host device 201, the command parser 543 fetches the PRP(s) or a PRP list in the command. In one example, the command can have up to two PRPs (e.g., each having a corresponding GPA). In another example, if more than two PRPs are present, a PRP list pointer can be included in a PRP. The command parser 543 is responsible for fetching the PRP list. It is noted that a PRP list pointer may need to be translated. In such a case, the PRP list pointer translation is substantially similar to a PRP translation, where the same translation engine(s) can be used for both types.

As illustrated in FIG. 5, the command parser 543 transmits a translation request to the ATC system 244. The translation request is received by the ATC system 244. The translation request includes a GPA bundle having GPAs for each of the PRPs associated with the command. The translation request can also include an HFID and the command ID associated with the command.

In one embodiment, the command parser 543 also tracks the ATC system 244's occupancy and only issues translation requests when space is available in the ATC system 244.

In block 606, the ATC system performs a function check on the translation request, for example, based on the HFID. The ATC system also performs a pending ATS invalidation check on the entire GPA bundle in the translation request.

With reference to FIG. 5, in the ATC system 244, the function check engine 550 performs a function check to ensure that the function associated with the HFID (e.g., the ATS function) is supported. If the function is supported, (e.g., the ATS function is enabled), then the function check engine 550 forwards the translation request to the PIT check/scoreboard 552. If the function is not supported, (e.g., the ATS function is disabled), then an error translation response is issued. When the function is supported, the PIT check/scoreboard 552 performs a pending ATS invalidation check on the entire GPA bundle in the translation request. If any GPA in the bundle gets a hit in the PIT check/scoreboard 552, then the entire command is NACKed and the command should be retried at a later time. Otherwise, the ATC system 244 forwards the translation request to the ATC FLM 554.

In block 608, the ATC system 244 stores address translation information in a multi-table cache memory, the address translation information comprising at least one system physical address (SPA) of the host memory translated from the at least one GPA. The address translation information stored in the multi-table cache memory is indexed based on the command ID.

Figure 7:
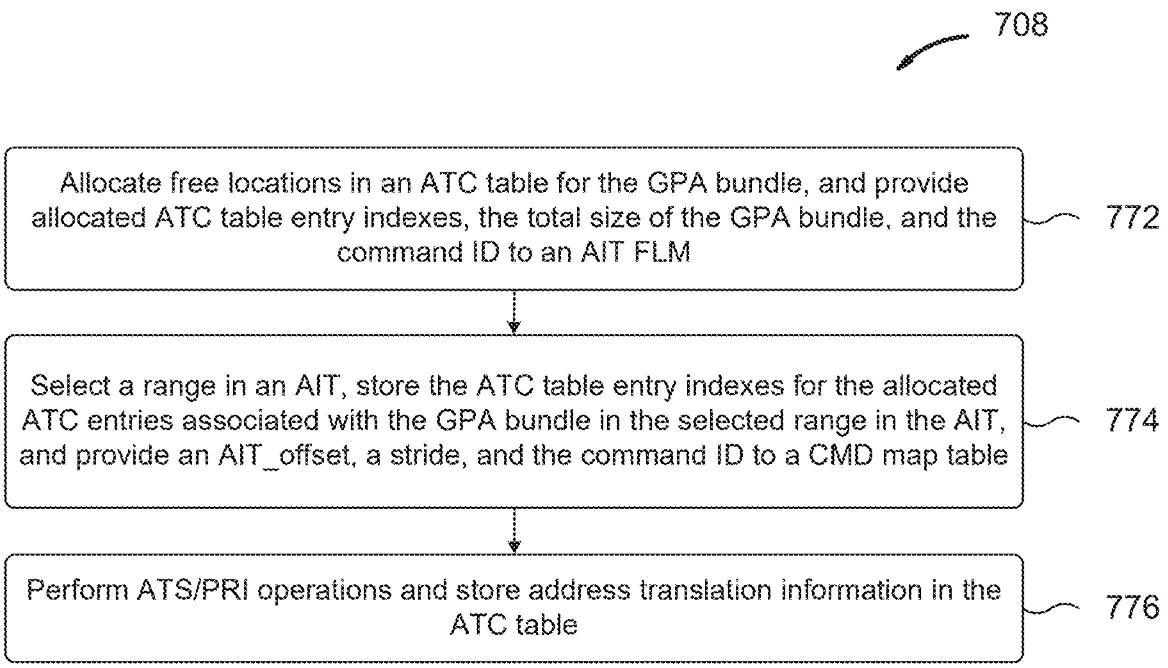
FIG. 7 illustrates a flowchart diagram of a method for storing address translation information in a multi-table cache memory, in accordance with an example embodiment of the present disclosure.

FIG. 7 illustrates a flowchart diagram 708 of a method for storing address translation information in a multi-table cache memory, in accordance with an example embodiment of the present disclosure. For example, the flowchart diagram 708 illustrates blocks 772, 774, and 776 for performing block 608 in FIG. 6.

In block 772, an ATC FLM allocates free locations in an ATC table for the GPA bundle. The ATC FLM also provides the ATC table entry indexes corresponding to the allocated locations of the ATC table, the total size of the GPA bundle, and the command ID to an AIT FLM.

With reference to FIG. 5, the ATC system 244 includes the multi-table cache memory 560 for storing cached address translation information. The multi-table cache memory 560 includes an ATC table 562, an AIT 564, and a CMD map table 566.

The ATC table 562 stores the cached address translation entries. In one example, the size of the ATC table 562 (e.g., ATCSIZE) can be determined by:

$$ATCSIZE = \frac{SSDlatency * \text{Host Bandwidth}}{4096}. \quad \text{Equation (1)}$$

The ATCSIZE represents the maximum number of entries that the ATC table 562 can store. The SSDlatency represents the SSD I/O latency. The Host Bandwidth represents the bandwidth of the host interface. For example, each ATC table entry can store the translation for a 4 KB page pointer corresponding to an NVMe PRP or PRP list pointer. In the SSDs, the SSD block size can also be 4 KB. Also, the NVMe host drivers may prefer to use 4 KB pages to eliminate misalignment issues and reduce memory allocation overhead.

In one embodiment, the ATC table 562 is sized as per Equation (1) to support the target bandwidth under the typically worst expected SSD I/O latency (e.g., 99% tail latency). For example, an NVMe interposer (e.g., the interposer 204 as shown and described in FIG. 2) can support a PCI Gen5x16 host interface supporting up to 64 GB/sec and SSDs with a 99% tail read latency of 500 microseconds.

In some embodiments, the command ID associated with each command is indexed and/or stored in at least one of the ATC table 562, the AIT 564, and the CMD map table 566. In some embodiments, the command ID associated with each command is indexed and/or stored in each of the ATC table 562, the AIT 564, and the CMD map table 566.

The AIT 564 stores the ATC table entry indexes for the entire PRP list in contiguous locations for each command. In one embodiment, the AIT 564 has more entries than the ATCSIZE.

The CMD map table 566 stores one entry for each command based on the command ID, each CMD map table entry stores an AIT_offset and a stride.

The ATC FLM 554 is responsible for allocating free locations in the ATC table 562 for the GPAs in the GPA bundle. In the present embodiment, for each GPA in the GPA bundle, the ATC FLM 554 allocates one location (e.g., one table entry) in the ATC table 562. For example, if the bundle includes three GPAs (e.g., corresponding to three PRPs), the ATC FLM 554 allocates three locations (e.g., three table entries) in the ATC table 562. The ATC FLM 554 then stores the GPAs in the allocated locations (e.g., one GPA per location) in the ATC table 562. In some embodiments, a command can contain up to 65 GPAs corresponding to 65 PRPs.

In one embodiment, the number of PRPs per command is determined based on the I/O size. Each command can have a different number of PRPs. In one example, with the maximum data transfer size (MDTS) being 256 KB (e.g., MDTS=256 KB) and the PRP size being 4 KB (e.g., PRP Size=4 KB), each command can have 1 to 65 PRPs. It should be noted that the number of GPAs (or PRPs) contained in a command is not limited to 65. The differences in command size can cause the ATC table to be fragmented. The multi-table cache memory 560 allows efficient utilization of the ATC table while keeping the data path translation simple. The ATC FLM 554 keeps track of the free locations (or entries) in the ATC table 562. The entry allocation in the ATC table 562 can be scattered and does not require contiguous entries.

In the present embodiment, the multi-table cache memory 560 takes into consideration that, for delivering a certain amount of device bandwidth, the number of outstanding commands drops proportionally to the data size of each command. For example, if each command contains a single PRP, then the ATCSIZE commands can be outstanding. But, if the commands contain 64 PRPs, then only ATCSIZE/64 commands can be outstanding. The multi-table cache memory 560 in the present embodiment can reduce the overall on-die memory size (e.g., the SRAM size) by implementing multiple AIT ranges each covering a GPA (or PRP) bundle size.

In contrast, a traditional ATC only contains a single table that requires a total of Max number of PRPs*Max number of commands of ATC table entries. In other words, a single-table ATC can consume 64 times the SRAM as compared to the multi-table cache memory 560 in the present embodiment.

After the ATC FLM 554 allocates free locations for the GPAs and stores the GPAs in the allocated locations (e.g., one GPA per location) in the ATC table 562, the ATC FLM 554 provides the ATC table entry indexes corresponding to the allocated locations of the ATC table, the total size of the GPA bundle, and the command ID to the AIT FLM 558.

In block 774, the AIT FLM selects a range in an AIT based on the size of the GPA bundle. The AIT FLM allocates free locations (e.g., AIT entries) in the selected range of the AIT, and stores the ATC table entry indexes. The AIT FLM determines an AIT offset (AIT_offset) in the selected range, which indicates the AIT start index of the AIT table entries in the selected range. For example, the AIT_offset indicates where the ATC table entry indexes for the GPAs in the GPA bundle are written (e.g., in contiguous locations) in the selected range of the AIT. The AIT FLM then provides the AIT_offset, the stride (e.g., indicating the selected range), and the command ID associated with the command to a command map table.

With reference to FIG. 5, the AIT FLM 558 includes an array of FLMs (e.g., Range 1 FLM through Range N FLM) responsible for allocating free locations in the corresponding ranges in the AIT 564. The AIT 564 includes a number of different ranges (e.g., ranges 0, 1, 2, 3, etc.) for storing the ATC table entry indexes. The range number/ID is selected or determined based on the size of the GPA bundle. For example, the range ID is selected based on the total number of GPAs in the GPA bundle, which corresponds to the total number of PRPs in the PRP list. Based on the range number/ID, the corresponding range FLM allocates free locations (e.g., AIT entries) in the selected range of the AIT 564 in contiguous locations to store the ATC table entry indexes. The ATC table entry indexes correspond to the locations where the ATC entries for the GPAs are stored in the ATC table 562.

Table 1 illustrates an example AIT table size calculation table where the AIT table size is determined based on the total number of GPAs (e.g., bundle size) in the translation request.

TABLE 1

AIT Table Size Calculation

| Bundle Size minp:maxp | Range Number/ID | AIT Entries |
|---|---|---|
| 1 | 0 | 8192 |
| 2 | 1 | 4096 |
| 3:5 | 2 | 2730 * 4 |
| 6:17 | 3 | 1365 * 16 |
| 18:65 | 4 | 455 * 64 |

As shown in Table 1, range 0 of the AIT 564 includes 8192 AIT entries, and range 1 of the AIT 564 includes 4096 AIT entries. For ranges 2 through 4, range 2 of the AIT 564 includes 2730*4 AIT entries, range 3 of the AIT 564 includes 1365*16 AIT entries, and range 4 of the AIT 564 includes 455*64 AIT entries.

In one example, for the ranges having a range number/ID greater than 1, they may each roughly include (8192−minp*maxp) AIT entries. It is noted that, in the example shown in Table 1, minp indicates the minimum amount of PRPs in the corresponding range, whereas maxp indicates the maximum amount of PRPs in the corresponding range. It is assumed that a maximum PRP list has a Maximum Data Transfer Size (MDTS) of 256 KB (e.g., MDTS=256 KB), that the size of each PRP is 4 KB (e.g., PRP Size=4 KB), and that the ATC table size is 8192 (e.g., ATCSIZE=8192). As such, the AIT 564 roughly includes 70,568 AIT entries (e.g., based on the minp and maxp based calculation for ranges 0 through 4). By comparison, the simple implementation of a single ATC table would need roughly 532,480 entries.

According to Table 1, for a command having a bundle size of 1 (e.g., the command having 1 GPA corresponding to 1 PRP), the ATC table entry index associated with the GPA is stored in range 0 of the AIT 564. In another example, for a command having a bundle size of 3 (e.g., the command having 3 GPAs corresponding to 3 PRPs), the first ATC table entry index associated with the first GPA is stored in range 0 in the AIT 564. The second and third ATC table entry indexes associated with the second and third GPAs are stored in range 2 in the AIT 564 in contiguous locations (e.g., at free index* maxp). In yet another example, for a command having a bundle size of 65 (e.g., the command having 65 GPAs corresponding to 65 PRPs), the first ATC table entry index associated with the first GPA is stored in range 0 in the AIT 564, while the second through the sixty-fifth ATC table entry indexes associated with the second through the sixty-fifth GPAs are stored in range 4 in the AIT 564 in contiguous locations.

It is noted that, in the present embodiment, for each command, the ATC table entry index for the first GPA in the GPA bundle (regardless of the bundle size) is stored in range 0. Thus, range 0 in the AIT 564 does not need an FLM as the space in range 0 of the AIT table is guaranteed for each command regardless of the bundle size. As mentioned above, the command parser 543 controls the number of commands outstanding in the ATC system 244 to ensure there is sufficient space available in the ATC table 562 and the AIT 564.

The AIT FLM 558 allocates the AIT entries to the selected range based on the size of the GPA bundle. The maximum number of commands per range is calculated by the smallest bundle size in the given range.

The AIT FLM 558 finds the free locations in the selected range of the AIT 564, and determines an AIT offset (AIT_offset) in the selected range, which indicates the AIT start index of the AIT table entries in the selected range. For example, the AIT_offset indicates where the ATC table entry indexes for the GPAs in the GPA bundle are written (e.g., in contiguous locations) in the selected range of the AIT 564. The AIT FLM 558 then provides the AIT_offset, the stride (e.g., indicating the selected range), and the command ID associated with the command to the CMD map table 566.

In block 776, the ATC system performs ATS/PRI operations and store address translation information in the ATC table.

With reference to FIG. 5, the ATS/PRI state machine/scoreboard 556 of the ATC system 244 performs ATS/PRI operations, for example, as per the PCIe specification. The ATS/PRI state machine/scoreboard 556 has sufficient outstanding ATS translation requests to absorb the worst case I/O operations per second (IOPS) requirements. With 4 KB I/O being the industry standard, the total number of outstanding ATS translation requests is calculated by:

$$\text{Outstanding } ATS = \frac{2 * \text{target } BW * \text{target Latency}}{4096\ B}. \qquad \text{Equation (2)}$$

In one embodiment, the ATS/PRI operations performed by the ATC system 244 may be substantially similar to the ATS/PRI operations described with reference to FIG. 4. Thus, the details of the ATS/PRI operations are omitted for brevity.

After the address translation information is received by the ATC system 244, the ATC system 244 writes the translated physical addresses (e.g., SPAs) into the associated ATC table entries in the ATC table 562 where the corresponding GPAs are stored.

In block 610, after the translation information is stored in the multi-table cache memory, the ATC system transmits a translation response to the controller.

With reference to FIG. 5, after each of the address translations associated with the GPAs in the command is populated in the ATC table 562 of the multi-table cache memory 560, the ATC system 244 transmits a translation response (e.g., a translation success) to the command parser 543 to indicate that the translation of the GPAs in the command is completed. On the other hand, if there is an error for the translations, the translation response is an error response. If any GPA in the bundle gets a hit in the PIT, translation response is a NACK response. In the present embodiment, each GPA bundle gets a translation response.

In block 612, the command parser converts each GPA in the GPA bundle into a Drive Physical Address (DPA), embeds the command ID into each DPA, and forwards the command with the DPAs to a memory storage device through an accelerator.

With reference to FIG. 5, after receiving the translation response (e.g., a translation success), the command parser 543 converts each GPA into a DPA, which is an internal address format for the NVMe SS 222. The command parser 543 embeds the command ID into each DPA, and forwards the command with the DPAs to the accelerator 246. The accelerator 246 can execute the command without incurring further ATS/PRI translation delays as each of the required translations are performed in the ATC system 244.

The accelerator 246 then provides the command to the backend of the memory storage device 206 through the NVME queues implemented in the accelerator 246. The memory storage device 206 can fetch the command from the accelerator 246, so that the DPAs (corresponding to the PRPs or PRP list) presented to the memory storage device 206 are each embedded with the command ID.

In block 614, the ATC receives a memory access request from the memory storage device, for example, through the accelerator.

With reference to FIG. 5, after receiving the command from the accelerator 246, the memory storage device 206 can process the command and issue a memory access request, such as a DMA read or write request. The memory access request (e.g., IX=fn(DPA)) includes one or more DPAs (e.g., modified GPAs (or PRPs)) and the embedded command ID. The memory access request is transmitted to the ATC system 244 through the accelerator 246.

In block 616, the ATC system reads the CMD map table to determine the AIT start index and the selected range of the AIT where the corresponding ATC table entry index is stored.

With reference to FIG. 5, the ATC system 244 decodes the DPA in the memory access request to obtain the GPA and the command ID. The command ID is indexed in the CMD map table 566. Based on the command ID, the ATC system 244 reads the CMD map table 566 to find the AIT_offset and the stride associated with the command ID in the CMD map table 566. In the present embodiment, the ATC system 244 reads the stride to determine the selected range of the AIT 564 where the associated ATC table entry index is stored. The ATC system 244 also reads the AIT_offset, which is used to determine the start index of the AIT entry stored within the selected range of the AIT 564.

In block 618, the ATC system reads the AIT to obtain the ATC table entry index associated with the GPA.

With reference to FIG. 5, the ATC system 244 reads the AIT entry based on the stride and the AIT_offset. The AIT entry stores the ATC table entry index indicating the location of the ATC entry in the ATC table 562. In other words, by reading the AIT 564, the ATC system 244 can locate the AIT entry or location that stores the ATC table entry index associated with the GPA.

In block 620, the ATC system reads the ATC table to obtain the SPA associated with the GPA, and provides the SPA to the host device.

With reference to FIG. 5, the ATC system 244 reads the ATC table entry based on the ATC table entry index stored in the AIT 564. The ATC table entry stores the address translation information having the SPA associated with the GPA. The ATC system 244 then provides the SPA to the host device 201 for the memory access request. The ATC system 244 can also provide the HFID associated with the memory access request to the host device 201.

In some embodiments, the SPA may indicate whether the memory is pinned or unpinned. If it is pinned, then the interposer may perform an untranslated DMA operation. If it is unpinned, then the interposer may perform a translated DMA operation.

In block 622, after the command is fully processed, the ATC system receives a translation release request to release (or evict) the entries associated with the command in the ATC system. Also, after the command is completed, the controller releases the command ID back to the command ID pool. As a result, the command ID can be recycled.

With reference to FIG. 5, after the memory access request is fully processed, the accelerator 246 is informed that the command is completed. Then, the accelerator 246 transmits a translation release request to the translation release engine 568 in the ATC system 244. The translation release request includes the command ID associated with command to be released. In response to receiving the translation release request and based on the command ID, the translation release engine 568 clears the following:

a) the entries (e.g., AIT_offset, stride, etc.) in the CMD map table 566;
b) the entries (e.g., ATC table entry indexes, etc.) in the AIT 564;
c) the entries (e.g., SPA, GPA, HFID, etc.) in the ATC table 562;
d) the entries in the ATC FLM 554; and
e) the entries in the AIT FLM 558.

In block 624, the ATC system performs ATS invalidation and update the PIT.

With reference to FIG. 5, the ATC system 244 may receive an ATS invalidation request from the host device 201 through a PCIe interface. Upon receiving the ATS invalidation request, the ATC system 244 populates the PIT check/scoreboard 552 and forwards the ATS invalidation request to an ATC invalidation handler (engine). The handler can be a state machine or a local microprocessor core. The ATS invalidation handler takes the responsibility to scan through the tables to make sure the invalidated GPA range is not in use. After making sure the invalidated GPA range is not in use, the ATS invalidation handler clears the valid bit in the PIT and causes the ATC system 244 to transmit an invalidation completion.

It is noted that when the GPA range to be invalidated is in use by a memory access request based on an outstanding command, the ATS invalidate request is not performed or executed until the command is completed. In other words, the ATC system 244 ensures that there is no DMA outstanding for the GPA range to be invalidated before the firmware allows the invalidation process to be executed. The ATC system 244 also stops new translation requests (by not accepting new commands) for the GPA range under invalidation while the invalidation process is in progress, and waits for the commands in execution referencing the GPA range to complete. The ATC system 244 also ensures that it does not accept new commands for the range that is getting invalidated while the invalidation process is in progress. As a result, ATC misses on actual usage of translated pages can be avoided, as such misses are not tolerable with cut-through DMA.

According to embodiments of the present disclosure, the ATC architecture can be used to support NVMe devices (e.g., NVMe controllers, NVMe accelerators, and/or NVMe interposers), for example, for cloud infrastructure. The ATC architecture caches translations for outstanding NVMe commands indexed by command IDs. The ATC architecture utilizes a multi-table structure to reduce the size of the on-die memory needed by the ATC. In the case of an NVMe SSD being a DMA initiator for host memory accesses corresponding to disk reads and writes, the ATC architecture ensures that the memory pages are present in the host to avoid page faults.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. An interposer connectable between a host device and a storage device, the interposer comprising:

a controller; and an address translation cache (ATC) system communicatively coupled to the controller;

wherein the ATC system is configured to:

receive a translation request from the controller, the translation request comprising a command identifier (ID) associated with a command and at least one guest physical address (GPA), the at least one GPA being associated with at least one physical region page (PRP) located in a host memory of the host device;

store address translation information in a multi-table cache memory, the address translation information comprising at least one system physical address (SPA) of the host memory translated from the at least one GPA, wherein the address translation information is indexed based on the command ID; and transmit a translation response to the controller after the address translation information is stored in the multi-table cache memory.

2. The interposer of claim 1, wherein the multi-table cache memory comprises an ATC table, an ATC Indirect table (AIT), and a command map table.

3. The interposer of claim 2, wherein the ATC system storing the address translation information in the multi-table cache memory comprises:

storing the at least one SPA and the at least one GPA in an ATC table entry of the ATC table;

storing an ATC table entry index of the ATC table entry in an AIT entry of the AIT; and storing a stride and an AIT offset indicating a start index of the AIT entry in the command map table.

4. The interposer of claim 1, wherein the controller is configured to:

receive the command from the host device; and assign the command ID to the command.

5. The interposer of claim 1, wherein, after receiving the translation response, the controller is configured to:

convert the at least one GPA to a drive physical address (DPA);

encode the command ID in the DPA; and transmit the command having the DPA and the command ID to the storage device.

6. The interposer of claim 5, wherein the ATC system is further configured to:

receive a memory access request associated with the command from the storage device, wherein the memory access request comprises the DPA embedded with the command ID; and provide the at least one SPA stored in the multi-table cache memory based on the DPA and the command ID to the host device.

7. The interposer of claim 1, wherein the ATC system is further configured to:

release the address translation information from the multi-table cache memory after the command is completed.

8. The interposer of claim 1, wherein the ATC system is further configured to:

receive an address translation service (ATS) invalidate request to invalidate the at least one GPA; and perform ATS invalidation after the command is completed.

9. The interposer of claim 1, wherein the interposer comprises a non-volatile memory express (NVMe) interposer.

10. The interposer of claim 1, wherein the storage device comprises at least one solid state drive.

11. An address translation cache (ATC) system, comprising:

circuitry configured to:

receive a translation request, the translation request comprising a command identifier (ID) associated with a command and at least one guest physical address (GPA), the at least one GPA being associated with at least one physical region page (PRP) located in a host memory; and store address translation information in a multi-table cache memory, the address translation information comprising at least one system physical address (SPA) of the host memory translated from the at least one GPA, wherein the address translation information is indexed based on the command ID.

12. The ATC system of claim 11, wherein:

the multi-table cache memory comprises an ATC table, an ATC Indirect table (AIT), and a command map table; and the circuitry is further configured to:

store the at least one SPA and the at least one GPA in an ATC table entry of the ATC table;

store an ATC table entry index of the ATC table entry in an AIT entry of the AIT; and store a stride and an AIT offset indicating a start index of the AIT entry in the command map table.

13. The ATC system of claim 11, wherein the circuitry is further configured to:

transmit a translation response after the address translation information is stored in the multi-table cache memory.

14. The ATC system of claim 11, wherein the circuitry is further configured to:

receive a memory access request associated with the command, wherein the memory access request comprises a drive physical address (DPA) being associated with the at least one GPA and embedded with the command ID; and provide the at least one SPA stored in the multi-table cache memory based on the DPA and the command ID.

15. The ATC system of claim 11, wherein the circuitry is further configured to:

release the address translation information from the multi-table cache memory after the command is completed.

16. The ATC system of claim 11, wherein the circuitry is further configured to:

receive an address translation service (ATS) invalidate request to invalidate the at least one GPA; and perform ATS invalidation after the command is completed.

17. A method by an address translation cache (ATC) system, the method comprising:

receiving a translation request, the translation request comprising a command identifier (ID) associated with a command and a guest physical address (GPA) bundle having at least one GPA, the at least one GPA associated with at least one physical region page (PRP) located in a host memory;

storing address translation information in a multi-table cache memory, the address translation information comprising at least one system physical address (SPA) of the host memory translated from the at least one GPA, wherein the address translation information is indexed based on the command ID; and transmitting a translation response after the address translation information is stored in the multi-table cache memory.

18. The method of claim 17, further comprising:

receiving a memory access request associated with the command, wherein the memory access request comprises a drive physical address (DPA), the DPA being associated with the at least one GPA and embedded with the command ID; and providing the at least one SPA from the multi-table cache memory based on the DPA and the command ID.

19. The method of claim 17, further comprising:

releasing the address translation information from the multi-table cache memory after the command is completed.

20. The method of claim 17, wherein the storing address translation information in the multi-table cache memory comprises:

storing the at least one SPA and the at least one GPA in an ATC table entry of an ATC table;

storing an ATC table entry index of the ATC table entry in an ATC Indirect table (AIT) entry of an AIT; and storing a stride and an AIT offset indicating a start index of the AIT entry in a command map table.

* * * * *